(12) United States Patent
Coiec et al.

(10) Patent No.: US 10,738,803 B2
(45) Date of Patent: Aug. 11, 2020

(54) SERVO CONTROL, ROTOR AND AIRCRAFT

(71) Applicant: AIRBUS HELICOPTERS, Marignane (FR)

(72) Inventors: Clement Coiec, Munich (DE); Jean-Romain Bihel, Le Rove (FR); Arnaud Groll, Calas (FR)

(73) Assignee: AIRBUS HELICOPTERS, Marignane (FR)

( * ) Notice: Subject to any disclaimer, the term of this patent is extended or adjusted under 35 U.S.C. 154(b) by 288 days.

(21) Appl. No.: 15/834,550

(22) Filed: Dec. 7, 2017

(65) Prior Publication Data

US 2019/0178266 A1 Jun. 13, 2019

(51) Int. Cl.

| F15B 20/00 | (2006.01) |
|---|---|
| B64C 27/605 | (2006.01) |
| F15B 13/02 | (2006.01) |
| F15B 21/00 | (2006.01) |
| F15B 7/08 | (2006.01) |
| B64C 27/64 | (2006.01) |

(52) U.S. Cl.
CPC .......... *F15B 20/005* (2013.01); *B64C 27/605* (2013.01); *B64C 27/64* (2013.01); *F15B 7/08* (2013.01); *F15B 13/021* (2013.01); *F15B 21/001* (2013.01); *F15B 2211/8752* (2013.01)

(58) Field of Classification Search
CPC ................ F15B 20/005; F15B 15/1466; F15B 2211/7128; F15B 15/1404; F15B 15/1476; F15B 15/24; F15B 2211/7107; F15B 13/021; F15B 21/001; F15B 7/08; B64C 27/64; B64C 27/605
See application file for complete search history.

(56) References Cited

U.S. PATENT DOCUMENTS

| 3,376,795 A * | 4/1968 | Allen ................... F15B 15/1466 |
|---|---|---|
| | | 92/130 R |
| 4,662,606 A * | 5/1987 | Akesaka ................. E21B 7/046 |
| | | 254/29 R |

(Continued)

FOREIGN PATENT DOCUMENTS

| DE | 102004045011 A1 * | 4/2006 | ............ F15B 11/024 |
|---|---|---|---|
| DE | 102004045011 A1 | 4/2006 | |
| FR | 2009421 A1 | 2/1970 | |

(Continued)

OTHER PUBLICATIONS

French Search Report for French Application No. FR 1601560, Completed by the French Patent Office, dated Jul. 5, 2017, 7 pages.

*Primary Examiner* — Abiy Teka (74) *Attorney, Agent, or Firm* — Brooks Kushman P.C.

(57) ABSTRACT

A servo-control. The servo-control comprises at least one body as well as a power shaft and a control piston arranged in each body, the at least one body and the power shaft respectively forming two power members. One of the power members bears at least on end-stop member and the power member without an end-stop member bears a passivation actuator. The passivation actuator comprises a passivation shaft which bears an end-stop and a passivation piston, the passivation piston being arranged to be mobile in longitudinal translation in an enclosure, an elastic system being arranged between the passivation piston and the enclosure.

20 Claims, 3 Drawing Sheets

(56) References Cited

U.S. PATENT DOCUMENTS

9,428,262 B2    8/2016   Bihel et al.
2006/0207246 A1*   9/2006   Hindman ............. A01D 34/246
                                                                               60/413

FOREIGN PATENT DOCUMENTS

| FR | 2433659 | A1 | 3/1980 |
| FR | 3020038 | A1 | 10/2015 |
| GB | 544793 | | 2/1941 |
| GB | 1230691 | | 5/1969 |
| GB | 2026406 | A | 2/1980 |

* cited by examiner

SERVO CONTROL, ROTOR AND AIRCRAFT

BACKGROUND OF THE INVENTION (1) Field of the Invention

The present invention relates to a servo-control, as well as a rotor and an aircraft provided with this servo-control.

(2) Description of Related Art

Conventionally, an aircraft comprises piloting members called "maneuvering members" for convenience. The maneuvering members make it possible to control the displacement of the aircraft in space. These maneuvering members can comprise blades of a rotor and in particular a lift rotor of a rotary-wing aircraft, or even rudders or elevators for example.

The control members of the aircraft are driven by members called "control members" for convenience. The control members are linked to the maneuvering members by control chains. For example, control members can comprise an automatic piloting system and/or flight controls maneuvered by a pilot.

An automatic piloting system can include a computer driving at least one cylinder. For example, the computer drives a cylinder with slow action and full authority on the control and/or at least one cylinder with rapid action and with limited authority.

Certain aircrafts have an assistance member for boosting the force exerted by a pilot or by an automatic piloting system. On a helicopter, hydraulic servo-controls are conventionally used for this purpose, each servo-control being driven by the control members. The control members are thus linked to the hydraulic distributors of the servo-controls.

Usually, the servo-controls comprise a cylinder provided with at least one body and one power shaft.

Among the different types of cylinder, a single-body cylinder is provided with a single body in which is displaced a piston borne by the power shaft. The power shaft can comprise one or more pipes.

A multi-body cylinder is provided with a plurality of bodies. Each body houses a piston, the pistons being borne by the power shaft. A double-body cylinder is commonly used in the aeronautical field. When the servo-control is provided with several bodies, these bodies are secured to one another.

Thus, a servo-control cylinder comprises a subassembly provided with one or more bodies depending on the type of cylinder.

Independently of the cylinder type, this subassembly and the power shaft are mobile in translation relative to one another.

For example, the power shaft is articulated at a fixed point in the reference frame of the aircraft, the body subassembly being articulated to a maneuvering member that is mobile in this reference frame. Consequently, each body slides along the power shaft. Such a servo-control is called a "mobile-body" servo-control.

Alternatively, the power shaft is articulated to a mobile maneuvering member, the body subassembly being articulated at a fixed point in the reference frame of the aircraft. Consequently, the power shaft slides along each body. Such a servo-control is called a "fixed-body" servo-control.

Whatever the alternative, the cylinder of the servo-control therefore comprises a mobile member and a member that is substantially immobile to be able to be extended or retracted.

Moreover, each body comprises an outer jacket delimiting an internal space. Consequently, each control piston divides the internal space of the body into a retraction chamber and an extension chamber. The expression "retraction chamber" denotes a chamber provoking the retraction of the servo-control when said chamber is filled by a hydraulic fluid. Conversely, the expression "extension chamber" denotes a chamber provoking the extension of the servo-control when said chamber is filled by a hydraulic fluid.

Such a hydraulic fluid is more simply called fluid hereinbelow, and can be oil for example.

Furthermore, the servo-control comprises a hydraulic distributor for each body.

When a control member requires the displacement of a maneuvering member, an order is then transmitted to the hydraulic distributor of each body. The hydraulic distributor injects the hydraulic fluid into the appropriate hydraulic chamber. Depending on the orders given, the hydraulic distributor therefore injects the hydraulic fluid into the retraction chamber or the extension chamber of a body and thereby induces the retraction or the extension of the servo-control. The hydraulic distributor also allows the evacuation of the fluid from the other chamber.

The intake of a fluid under pressure into one of the chambers of a body generates a pressure difference between the pressures prevailing in the retraction chamber and the extension chamber of a body. This pressure difference tends to displace the body of the cylinder or the power shaft depending on the nature of the servo-control to a position of equilibrium. When the position of equilibrium required of the servo-control is reached, the hydraulic distributor is closed.

To this end, a hydraulic distributor can comprise at least one slide valve that is mobile in a housing. The controls of an aircraft are then arranged to induce a displacement of the slide valve in relation to the housing. Depending on the position of the slide valve in the housing, the slide valve allows or prohibits the circulation of the fluid through the hydraulic distribution between a hydraulic circuit and the cylinder of the servo-control.

A hydraulic distributor can possibly comprise a single slide valve called the "main slide valve" for convenience. Alternatively, a hydraulic distributor can comprise a main slide valve that is mobile in a secondary slide arranged in the housing. In normal conditions, the main slide valve is mobile in relation to the secondary slide valve, this secondary slide valve being immobile in relation to the housing. In case of ceasing of the main slide valve in the secondary slide valve, the main slide valve and the secondary slide valve are displaced together in relation to the housing.

Independently of the variant of the hydraulic distributor, each slide valve can be mobile in translation or in rotation in relation to the housing.

The control members therefore make it possible to control the position of at least one slide valve in the housing, for example to connect a fluid supply orifice of the housing with a chamber of a body of a servo-control, and a fluid evacuation orifice of the housing with the other chamber of this body.

In order for the circulation of the fluid to be interrupted when the cylinder reaches the required position, the position of the slide valve in relation to the housing is interlocked with the position of the cylinder, namely the position of the power shaft in relation to each body of the servo-control. This interlocking can be produced mechanically. According to one example, a connecting rod called a "mimic rod" links the mobile member of the cylinder to the housing, in particular with a fixed-body servo-control. On some servo-controls, the housing of a hydraulic distributor can be fixed to a body.

According to another aspect, the cylinder comprises a mobile member and a fixed member, namely, respectively, the bodies and the power shaft on a mobile-body servo-control or, respectively, the power shaft and the bodies on a fixed-body servo-control. Consequently, the servo-control comprises multiple dynamic seals arranged between the mobile member and the fixed member.

A first dynamic seal can be arranged on each control piston, between the control piston and the jacket of the body. The function of such a dynamic seal is to prevent an undesirable passage of fluid between the retraction chamber and the extension chamber of a body.

A second dynamic seal is also arranged between the power shaft and each body of the servo-control.

However, these can have degraded performance levels due to wear inducing leaks internal and external to the servo-control. These two types of leaks reduce the performance levels of the servo-control and therefore have an impact on the maintenance of this servo-control.

A leak of a second dynamic sealing induces an escape of fluid out of the servo-control. The leak can be detected by a visual inspection and results in the repair of the servo-control.

Conversely, the internal leaks between two chambers of one and the same body cannot be detected visually. These internal leaks result from a degradation of the first dynamic seals.

A so-called "dormant" failure can then occur assuming an undetected leak of a first dynamic seal.

To detect such dormant failures, a manufacturer can provide comprehensive maintenance operations performed at regular time intervals. These maintenance operations involve dismantling the servo-controls from the aircraft or using specific tools that are complex and difficult to implement. These operations therefore have a not-inconsiderable cost. The invention aims to optimize the detection of a leak of a first dynamic seal. On an aircraft that invokes a servo-control with a relatively high frequency of operation, the seals can wear prematurely and incur numerous maintenance operations.

The document FR 3020038 describes a hydraulic system provided with a servo-control. This servo-control comprises a cylinder allowing a leak between each body and the power shaft of the servo-control. Consequently, the hydraulic system comprises an enclosure surrounding the servo-control to collect the fluid leaking out of this servo-control.

The document FR 2433659 describes a hydraulic system provided with a main servo-control. The main servo-control is controlled by a lever via a secondary servo-control.

The documents GB544793, DE102004045011 and FR 2009421 are also known.

The document GB 544793 describes a servo-control provided with a position mimic lever which extends between a power shaft of the servo-control and a hydraulic fluid distribution slide valve. A shaft linked to a double spring cooperates with the position mimic lever.

BRIEF SUMMARY OF THE INVENTION

The object of the present invention is then to propose an alternative hydraulic system.

According to the invention, a servo-control comprises at least one body as well as a power shaft and a control piston arranged in each body, said power shaft of the servo-control being secured to each control piston of the servo-control, said at least one body and said power shaft respectively forming two power members, said two power members respectively comprising an immobile member which is immobile in a reference frame of the servo-control and a mobile member which is in longitudinal translation in relation to the immobile member.

The term "respectively" used previously means that one of the two power members represents the immobile member and the other power member represents the mobile member. Two configurations are then possible.

According to a first fixed-body variant, said at least one body and the power shaft respectively form the immobile member and the mobile member.

According to a second mobile-body variant, said at least one body and the power shaft respectively form the mobile member and the immobile member.

Independently of the variant, one of the power members comprises at least one end-stop member. The power member without the end-stop member bears a passivation actuator which is provided with an enclosure, the passivation actuator comprising a passivation shaft which bears an end-stop and a passivation piston, the passivation piston being arranged to be mobile in longitudinal translation in the enclosure, an elastic system being arranged between the passivation piston and the enclosure to tend to maintain the passivation shaft in a neutral position, the end-stop being arranged out of the enclosure and longitudinally facing each end-stop member to be able to enter into contact with each end-stop member in case of failure.

The expression "passivation piston being arranged to be mobile in longitudinal translation in the enclosure" means that the passivation piston can be displaced in translation in the enclosure by stressing the elastic system. The passivation piston and the enclosure can take the form of a cylinder.

The servo-control is then provided with a cylinder comprising each body and the power shaft. The servo-control also comprises a main hydraulic distributor for each body linked to this body, and capable of being linked to a main hydraulic circuit. Each main hydraulic distributor can be a hydraulic distributor of the type described previously.

In particular, the cylinder can be a high-performance cylinder without the dynamic seals of some prior arts. Such a cylinder is qualified as "high-performance" in as much as the cylinder can be stressed at high operating frequencies since this cylinder does not include dynamic seals likely to be degraded.

The servo-control is also provided with a passivation actuator.

In this context, two cases of failures of a servo-control provided with a cylinder and in particular with a high-performance cylinder can be distinguished.

A first so-called "hard-over" failure induces the generation of an induced setpoint that can result in the extension of the cylinder at high speed, and ultimately an arrival at the end-stop of the cylinder at high speed. The resulting shock proves potential destructive.

A second failure relates to the malfunction of the hydraulic circuit linked to the servo-control. In the absence of hydraulic fluid, the servo-control no longer assists a pilot.

Putting in place a passivation actuator comprising an end-stop capable of cooperating with an end-stop member of the mobile member can make it possible to reduce the impact of these failures.

Indeed, in a "hard-over" case, an end-stop member can enter into contact with the end-stop. Consequently, the passivation piston as well as the passivation shaft and the end-stop are displaced in translation in relation to the enclosure, or vice versa, to limit the consequences of the impact. A damping function can also be activated in order to dissipate a portion of the kinetic energy.

Moreover, and following the possible loss of hydraulic supply to the cylinder, the end-stop can be brought into contact against an end-stop member to displace the mobile member into a predetermined position for the rest of the flight.

Consequently, the invention can make it possible to obtain a servo-control having a high-performance cylinder that is robust to certain failures likely to occur.

The servo-control can also comprise one or more of the following features.

Thus, the end-stop member can comprise a first end-stop face and a second end-stop face arranged longitudinally on either side of the end-stop and facing one another.

Thus, one end-stop face can be in a "hard-over" case and the other end-stop face can be stressed in case of failure of the hydraulic circuit linked to the cylinder.

According to another aspect, the power member provided with the end-stop ember can comprise a first shoulder provided with the first end-stop face and a second shoulder provided with the second end-stop face, the first shoulder and the second shoulder being separated longitudinally by a space in which said end-stop is arranged.

For example, the first shoulder and the second shoulder are borne by the power shaft in the context of the first fixed-body variant.

In the context of the second mobile-body variant, the shoulders are for example borne by a body, or by a shaft secured to a body, even by an attachment secured to the body and provided with an articulation.

According to another aspect, the first end-stop face can be separated longitudinally from the second end-stop face by a length greater than a predetermined range of displacement of the mobile member in a non-failure case.

Consequently and except for the failure cases mentioned previously, the mobile member can be displaced without contact between the end-stop and an end-stop member.

For example the mobile member of the servo-control can be displaced by approximately plus or minus 10 (ten) millimeters in relation to a center. By contrast, said length can extend to 15 (fifteen) millimeters, the first end-stop face and the second end-stop face being situated equidistantly from said center in a non-failure case.

Following a failure, the potential travel of the mobile member can for example be approximately plus or minus 20 (twenty) millimeters in relation to the center, because of the freedom of displacement in translation of the end-stop.

According to another aspect, the elastic system can comprise two elastic members arranged longitudinally on either side of the passivation piston.

Each elastic member tends to place the passivation piston, and therefore the end-stop, in a predetermined position to be reached in a non-failure case.

Each elastic member can for example comprise at least one spring, possibly with low rigidities, or even at least one block of elastic material such a material from the group of elastomers.

According to another aspect, said end-stop is separated from the power member provided with each end-stop member by a transverse gap so as not to hamper the displacement of the mobile member in a non-failure case.

This transverse gap can be qualified as "radial" when the end-stop describes a ring delimiting an orifice in the form of a disk which surrounds the power member provided with each end-stop member. An annular space then radially separates the end-stop and the power member provided with each end-stop member.

Such a gap can tend to generate no friction with the mobile member and no centering action, in a non-failure case.

The passivation piston as well as the passivation shaft and the end-stop are possibly each of annular form and extend radially about an axis coinciding with a longitudinal axis along which the mobile member is displaced and the power shaft extends.

This proposition comprises a cylindrical actuator which reduces the overall bulk of the servo-control, due to the moderate increase in the diameter of a body bearing this passivation actuator compared to the prior art.

According to another aspect, no sealing means may be arranged between the control piston and the corresponding body and between the power shaft and each body.

The cylinder is then a high-performance cylinder.

By contrast, the enclosure can be sealed, at least one sealing means being arranged between said enclosure and the passivation piston.

This passivation actuator can possibly have at least one dynamic seal between the passivation shaft and the enclosure for the enclosure to be sealed, and at least one dynamic seal between the enclosure and the passivation piston.

These various seals make it possible to guarantee the correct operation of the passivation actuator. The potential wear of these dynamic seals is not problematic since these seals are ultimately stressed only on rare occasions, namely in the event of cases of failure.

According to another aspect, the enclosure can be fixed to at least one body.

Moreover, the passivation actuator comprises a damper which damps a longitudinal displacement of the passivation shaft.

Each seal fixed to the passivation shaft or to the passivation piston can possibly add a damping.

Nevertheless, the passivation piston separating a passivation retraction chamber and a passivation extension chamber formed in the enclosure, the damper can comprise at least one wire-drawing orifice linking the passivation extension chamber to the passivation retraction chamber.

When the end-stop is displaced in translation, the circulation of hydraulic fluid in the wire-drawing orifice adds a damping.

According to another aspect, each control piston can separate a control retraction chamber and a control extension chamber formed in a body, the servo-control comprising a main hydraulic distributor configured to be fluidically connected with a main hydraulic circuit as well as with the control retraction chamber and the control extension chamber. The servo-control comprises a hydraulic distributor called "secondary hydraulic distributor" configured to be fluidically connected with a secondary hydraulic circuit as well as with the passivation retraction chamber and the passivation extension chamber. The secondary hydraulic distributor has a slide valve configured to be controlled by the main hydraulic circuit, the slide valve being in a rest positon when the main hydraulic circuit is supplied with hydraulic fluid and in a passivation position when the main hydraulic circuit is not supplied with fluid, the slide valve not fluidically connecting the secondary hydraulic circuit and the passivation actuator in the rest position, the slide valve being configured to fluidically connect a secondary hydraulic supply link of the secondary hydraulic circuit and the passivation extension chamber and to fluidically connect a secondary hydraulic fluid return link of the secondary hydraulic circuit and passivation retraction chamber in order to displace the passivation shaft and the power shaft into an extreme position.

The term "slide valve" denotes a mobile element allowing the secondary hydraulic distributor to be "fluidically" closed or opened.

Consequently, the method for operating the servo-control is as follows.

In the nominal case, the passivation actuator is centered by the elastic system. The mobile member of the cylinder of the servo-control can operate in its nominal travel without being hampered by the end-stop.

In a "hard-over" case, the end-stop enters into contact with an end-stop member. The passivation piston is driven and generates a damping.

In case of loss of hydraulic pressure in the main hydraulic circuit, the slide valve of the secondary hydraulic distributor is displaced under the effect of this pressure drop. Consequently, this slide valve allows the secondary hydraulic circuit to inject fluid into the passivation extension chamber. Therefore, the passivation piston as well as the passivation rod and the end-stop are displaced in translation. The end-stop enters into contact with an end-stop member which induces a displacement of the mobile member into a position, for example fully extended, maintained throughout the duration of the flight of the aircraft.

According to another aspect, at least one servo-control can comprise a single body.

In addition to a servo-control, the invention targets a rotor provided with a plurality of blades. This rotor then comprises a servo-control of the type described previously, the servo-control being linked mechanically to each blade.

Possibly, the rotor comprises a set of swashplates linked to each blade by a pitch rod. The servo-control is articulated to said set of swashplates.

Moreover, the invention also targets an aircraft comprising at least one servo-control of the type described previously.

In particular, the aircraft can comprise such a servo-control in a rotor of the type described previously, even to maneuver secondary control surfaces of drift and tail unit type, for example.

BRIEF DESCRIPTION OF THE DRAWINGS

The invention and the advantages thereof will become apparent with more details in the context of the following description with examples given by way of illustration with reference to the attached figures which represent.

DETAILED DESCRIPTION OF THE INVENTION

The elements present in several distinct figures are assigned one and the same reference.

Three mutually orthogonal directions $\underline{X}$, $\underline{Y}$ and $\underline{Z}$ are represented in certain figures.

The first direction $\underline{X}$ is called longitudinal. The term "longitudinal" relates to any direction parallel to the first direction $\underline{X}$.

The second direction $\underline{Y}$ and the third direction $\underline{Z}$ are called transverse. The term "transverse" and the term "radial" relate to any direction contained in the plane YZ.

Figure 1:
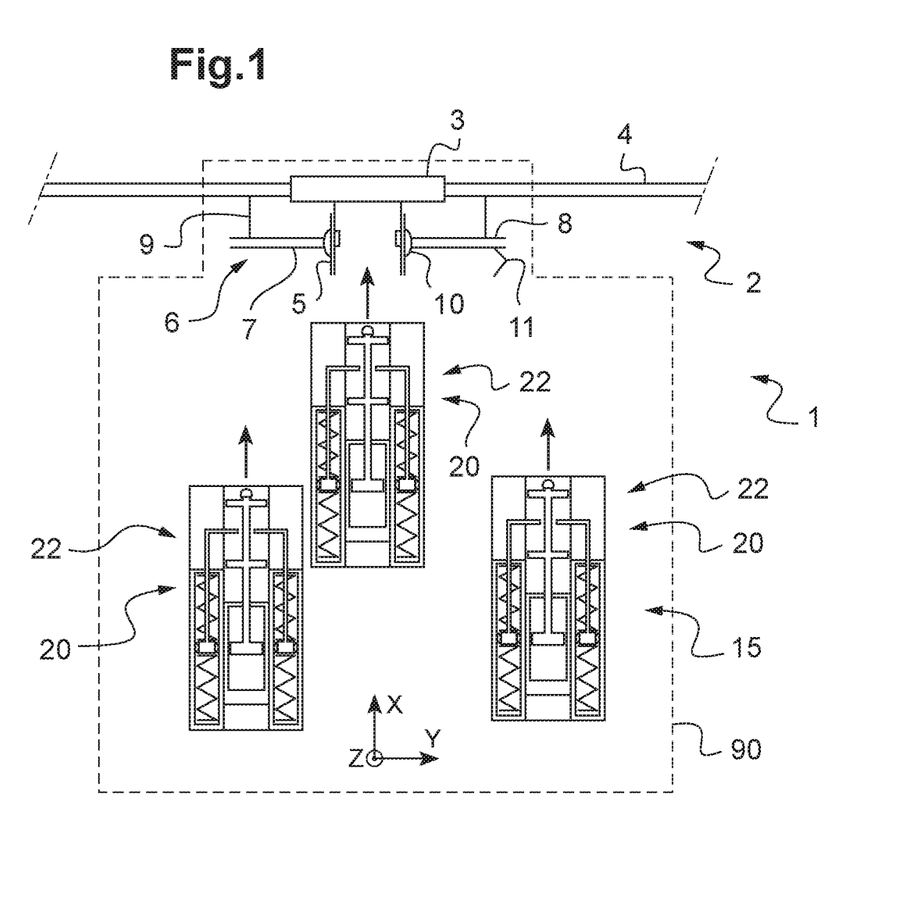
FIG. 1, a diagram presenting a rotor of an aircraft according to the invention.

FIG. 1 presents an aircraft 1 according to the invention represented partially.

This aircraft is provided with a hydraulic system according to a first variant for controlling maneuvering members of this aircraft.

According to the example represented the aircraft 1 comprises a rotor 2 bearing a plurality of blades 4. This rotor 2 is for example provided with a hub 3 bearing the blades 4. The hub 3 is then driven in rotation by a power transmission box via a rotor strut 5.

Consequently, the hydraulic system acts on the pitch control of the blades 4 of the rotor 2.

Such a rotor 2 can be a rotor called "main rotor" which at least partially ensures the lift, even the propulsion, of the aircraft. This rotor 2 can also be a rotor called a "tail rotor" participating in the control of the yaw movement of the aircraft.

Nevertheless, the invention applies to all types of aircraft maneuvering members.

Independently of the variant, the hydraulic system comprises at least one servo-control 20.

For example, this hydraulic system comprises three or four servo-controls 20 linked to flight control of the aircraft that are not illustrated.

Favorably, all the servo-controls of the hydraulic system are servo-controls 20 according to the invention.

Furthermore, each servo-control 20 is for example articulated directly, or by at least one connecting rod, to a set 6 of swashplates or equivalent.

Such an assembly 6 of swashplates comprises a non-revolving plate 7 articulated to a fixed torque link 11.

Furthermore, the assembly 6 of swashplates includes a revolving plate 8 which is articulated to a revolving torque link that is not represented. This torque link is said to be "revolving" since it is secured in rotation to the rotor mast 5 for example.

The revolving plate 8 is also linked to each blade 4 by a pitch rod 9.

Furthermore, the non-revolving plate 7 and the revolving plate 8 are arranged on a swivel joint 10 which slides parallel to the rotor mast 5.

Consequently, each servo-control 20 comprises a cylinder 22 which is articulated to the assembly 6 of swashplates.

This cylinder 22 can be a high-performance cylinder likely to exhibit hydraulic leaks. Consequently, the hydraulic system can comprise at least one jacket 90 to circumscribe the leak of hydraulic fluid out of at least one servo-control 20 according to the invention. At least one servo-control is arranged at least partially in a jacket 90. Favorably, all the maneuvering servo-controls of a member are arranged at least partially in a jacket 90.

Consequently, the leak escaping from a servo-control is collected by the jacket 90. This jacket 90 can be totally sealed. The jacket 90 can be of the type described in the document FR 3020038.

Figure 2:
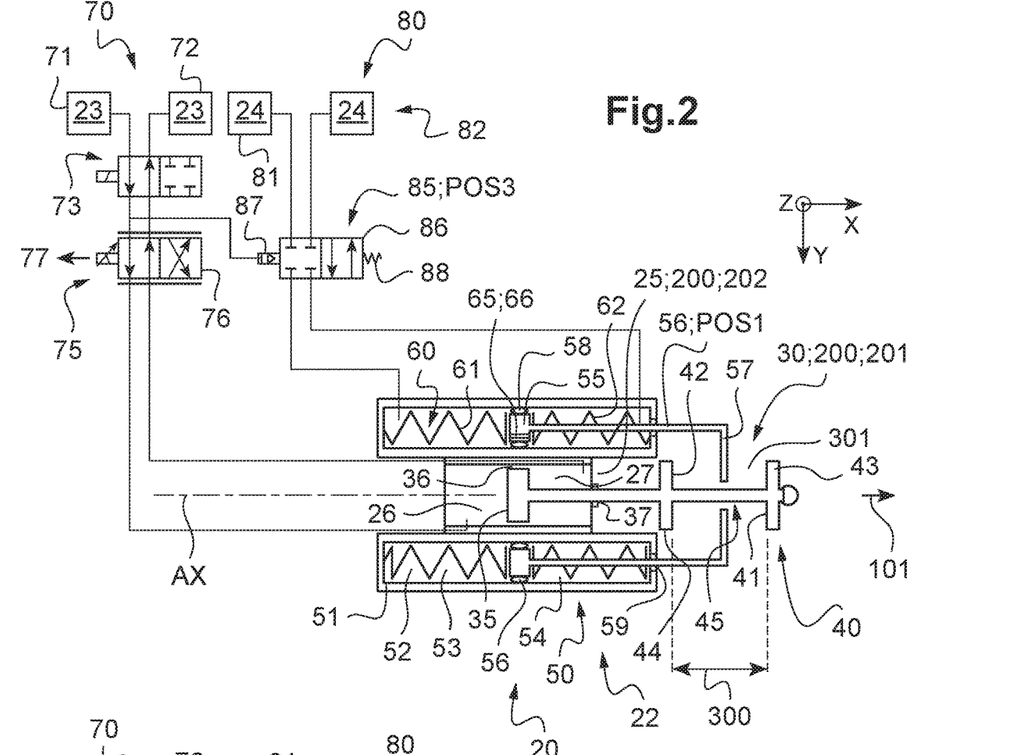
FIG. 2, a diagram presenting a servo-control according to the invention in a non-failure case, FIG. 3, a diagram presenting a servo-control according to the invention following a failure of "hard-over" type, and FIGS. 4 to 7, illustrations of various servo-controls.

Referring to FIG. 2, the servo-control comprises a cylinder 22.

The cylinder 22 of a servo-control 20 according to the invention comprises a power shaft 30 passing through at least one body 25. This power shaft 30 bears a control piston 35 for each body. Each control piston 35 can slide longitudinally in the corresponding body.

Each body 25 and the power shaft 30 associated with each control piston respectively form two distinct power members 200 which slide in relation to one another. These two power members 200 respectively represent an immobile member 202 which is immobile in a reference frame of the servo-control 20 and a mobile member 201 which is mobile in longitudinal translation in relation to the immobile member 202.

Thus, each body 25 and the power shaft 30 belong respectively to an immobile member 202 and to a mobile member 201, or each body 25 and the power shaft 30 belong respectively to a mobile member 201 and to an immobile member 202.

FIG. 2 thus illustrates a single-body, fixed-body servo-control. However, the servo-control can comprise at least one body and have a fixed or mobile body (bodies).

To extend or retract the cylinder, each control piston 35 divides an internal cavity of a body into a control extension chamber 26 and a control retraction chamber 27. The control extension chamber 26 and the control retraction chamber 27 are fluidically connected with a main hydraulic distributor 75.

This main hydraulic distributor 75 can be secured to the cylinder 22, for example to a body. If there are several bodies each body can cooperate with its own main hydraulic distributor.

The main hydraulic distributor 75 is also linked to a main hydraulic circuit 70. This main hydraulic circuit 70 can comprise a main hydraulic supply link 71 for routing a fluid 23 to the main hydraulic distributor 75. This main hydraulic circuit 70 can also comprise a main hydraulic fluid return link 72 to extract a fluid 23 from the main hydraulic distributor 75. This main hydraulic circuit 70 can also comprise a main hydraulic fluid return link 72 to extract a fluid 23 from the main hydraulic distributor 75.

Consequently, the main hydraulic distributor can comprise at least one first slide valve 76 that is mobile in rotation or in translation. This first slide valve 76 makes it possible:

to fluidically connect, on request, the main hydraulic supply link 71 and the main hydraulic fluid return link 72 respectively to the control extension chamber 26 and to the control retraction chamber 27, or to fluidically connect, on request, the main hydraulic supply link 71 and the main hydraulic fluid return link 72 respectively to the control retraction chamber 27 and to the control extension chamber 26, or to not fluidically connect, on request, the main hydraulic supply link 71 and the main hydraulic fluid return link 72 to the cylinder 22.

Thus, the flight controls 77 linked to the first slide 76 make it possible to control the main hydraulic distributor 75. This main hydraulic distributor 75 then injects, on request, a fluid 23 into the extension chambers of the cylinder to extend this cylinder, or into the retraction chambers of the cylinder to retract this cylinder.

Possibly, an on/off valve 73 is arranged on the main hydraulic circuit 70 upstream of the main hydraulic distributor 75. The term "upstream" should be considered in relation to the direction of flow of the fluid 23 to the main hydraulic distributor 75.

Moreover, the cylinder 22 can exhibit a fluid leak, possibly controlled and predefined. Such a servo-control is thus a controlled leak servo-control, and cannot be likened to a servo-control exhibiting an accidental leak resulting seal wear for example.

For this, no sealing means is for example arranged between the control piston 35 and the corresponding body and between the power shaft 30 and each body 25.

By contrast, the cylinder 22 can comprise a main control leak means 37 at each interface between a power shaft and a body, possibly in particular to avoid the ingress of outside particles into the cylinder 22. This main controlled leak means 37 allows a leak of the fluid contained in a body to the outside of the cylinder of the servo-control.

A secondary controlled leak means 36 can be arranged between at least one body 25 and the control piston 35 sliding in this body. Such a secondary means 36 then allows a leak of a hydraulic fluid between the control retraction chamber 27 and the control extension chamber 26 of this body 25.

Consequently, such a servo-control can have absolutely no dynamically stressed seals.

Furthermore, at least one controlled leak means can comprise a hydrodynamic bearing, or even expansion segments.

According to another aspect, one of the two power members 200 bears at least one end-stop member 40 and the other power member bears a passivation actuator 50 cooperating with the end-stop member.

According to the example of FIG. 2, the power shaft 30 bears the end-stop member 40 and a body 25 bears the passivation actuator 50.

Independently of the embodiment, the passivation actuator 50 is provided with an enclosure 52. The enclosure 52 can be fixed to the mobile member 201 or to the immobile member 202 of the cylinder 22. For example, the enclosure 52 is fixed to at least one body 25.

Moreover, the passivation actuator 50 comprises a passivation shaft 56. The passivation shaft 56 bears, on the one hand, an end-stop 57 which is situated outside of the enclosure and, on the other hand, a passivation piston 55 that is mobile in longitudinal translation in the enclosure 52. Consequently, the passivation shaft 56 extends at least longitudinally between the end-stop 57 and the passivation piston 55.

The passivation piston 55 as well as the passivation shaft and the end-stop 57 together form a piece that is mobile in longitudinal translation, for example with symmetry of revolution.

The passivation piston 55 as well as the passivation shaft 56 and the end-stop 57 can each have annular form extending radially about an axis AX. This axis AX for example coincides with a longitudinal axis X along which the mobile member 201 of the cylinder 22 is displaced, and along which the power shaft 30 extends.

For example, the passivation shaft 56 takes the form of a hollow cylinder with a circular base. The passivation piston 55 can take the form of a hollow cylinder with a circular base, but thicker than the passivation shaft 56 to protrude radially from the passivation shaft.

The end-stop can take the form of an annular disk protruding radially toward the power member provided with the end-stop member 40.

Possibly, the end-stop 57 is separated from the power member 200 provided with each end-stop member 40 by a transverse gap 301.

According to another aspect, the passivation piston 55 can divide a void of the enclosure 52 into a passivation retraction chamber 54 and a passivation extension chamber 53. The passivation retraction chamber 54 and the passivation extension chamber 53 are filled with a fluid.

The enclosure 52 can then be sealed. A first dynamic seal 59 can thus be arranged at each interface between the passivation shaft 56 and the enclosure 52. For example, each first dynamic seal 59 can be fixed to the enclosure 52.

Furthermore, a second dynamic seal 58 can be arranged between the enclosure 52 and the passivation piston 55. For example, the second dynamic seal 58 can be fixed to an edge of the passivation piston 55.

According to another aspect, the servo-control 20 can comprise a secondary hydraulic distributor 85. This secondary hydraulic distributor 85 can be secured to the cylinder 22, for example to a body or to the passivation actuator.

This secondary hydraulic distributor 85 is fluidically connected with a secondary hydraulic circuit 80. This secondary hydraulic circuit 80 can comprise a secondary hydraulic supply link 81 to supply a fluid 24 to the secondary hydraulic distributor 85. This secondary hydraulic circuit 80 can also comprise a secondary hydraulic fluid return link 82 to extract a fluid 4 from the secondary hydraulic distributor 80. In the context of a multi-body servo-control, the secondary hydraulic circuit 80 can represent the main hydraulic circuit of one of the bodies.

Furthermore, the secondary hydraulic distributor 85 is fluidically connected both with the passivation retraction chamber 54 and the passivation extension chamber 53.

Consequently, the secondary hydraulic distributor 85 comprises a second slide valve 86 more simply called a "slide valve". This slide valve 86 is mobile on request between:

a passivation position in which the slide valve 86 fluidically connects the secondary hydraulic supply link 81 and the secondary hydraulic fluid return link 82 respectively to the passivation extension chamber 53 and to the passivation retraction chamber 54, or a rest position POS3 in which the slide valve 86 does not fluidically connect the secondary hydraulic fluid supply link 81 and the secondary hydraulic supply link 82 to the passivation actuator 50.

The slide valve 86 can be controlled by the main hydraulic circuit. Consequently, the slide valve can extend between a buffer tank 87, linked to the main hydraulic supply link 71, and an elastic member 88.

According to another aspect, an elastic system 60 is arranged between the passivation piston 55 and the enclosure 52, to tend to maintain the passivation shaft 56 in the neutral positon POS1 illustrated in FIG. 2. This elastic system 60 can be provided with two elastic members 61, 62 arranged longitudinally on either side of the passivation piston 55.

According to another aspect, the passivation actuator 50 can comprise a damper 65 which damps a longitudinal displacement of the passivation shaft 56. This damper 65 comprises, for example, at least one wire-drawing orifice 66 making it possible to fluidically connect the passivation extension chamber 53 to the passivation retraction chamber 54.

Moreover, the end-stop 57 is borne by the passivation shaft 56. The end-stop 57 is arranged outside of the enclosure 52. Furthermore, the end-stop 57 longitudinally faces each end-stop member 40 to be able to enter into contact with each end-stop member 40 in case of failure.

To this end, the end-stop member 40 can comprise a first end-stop face 41 and a second end-stop face 42. The first end-stop face 41 and the second end-stop face 42 are arranged longitudinally on either side of the end-stop 57 and face one another. The first end-stop face 41 and the second end-stop face 42 can be parallel to at least one face of the end-stop.

Possibly, the power member 20 provided with the end-stop member 40 comprises a first shoulder 43 provided with the first end-stop face 41 and a second shoulder 44 provided with the second end-stop face 42. The first shoulder 43 and the second shoulder 44 are separated longitudinally by a space 45 in which the end-stop 57 is positioned.

According to the example represented in FIG. 2, the first shoulder 43 and the second shoulder 44 are borne by the power shaft 30.

Moreover, the first end-stop face 41 can be separated longitudinally from the second end-stop face 42 by a length 300 greater than a predetermined range of displacement of the mobile member 201 in a non-failure case.

In the absence of hydraulic failure, the main hydraulic supply link 71 supplies the buffer tank 87. The fluid contained in the buffer tank 87 then exerts a pressure on the slide valve 86 to maintain the slide valve in the rest position POS3. The passivation shaft 56 is then in a neutral position POS1.

When flight controls 77 control the main hydraulic distributor 75, the cylinder 22 is extended or retracted. This movement of the cylinder 22 is not hampered by the end-stop 57.

In the case of presence of a failure of "hard over" type an instruction for rapid extension of the cylinder 22 is given accidentally to the main hydraulic distributor 75. The extension of the cylinder leads to a displacement in a first direction 101 of the end-stop member 40 in relation to the end-stop 57. When the end-stop member 40, and, according to the example represented, the second end-stop face, enters into contact with the end-stop 57, this end-stop 57 is in turn displaced. This displacement is damped by the damper of the passivation actuator.

Figure 3:
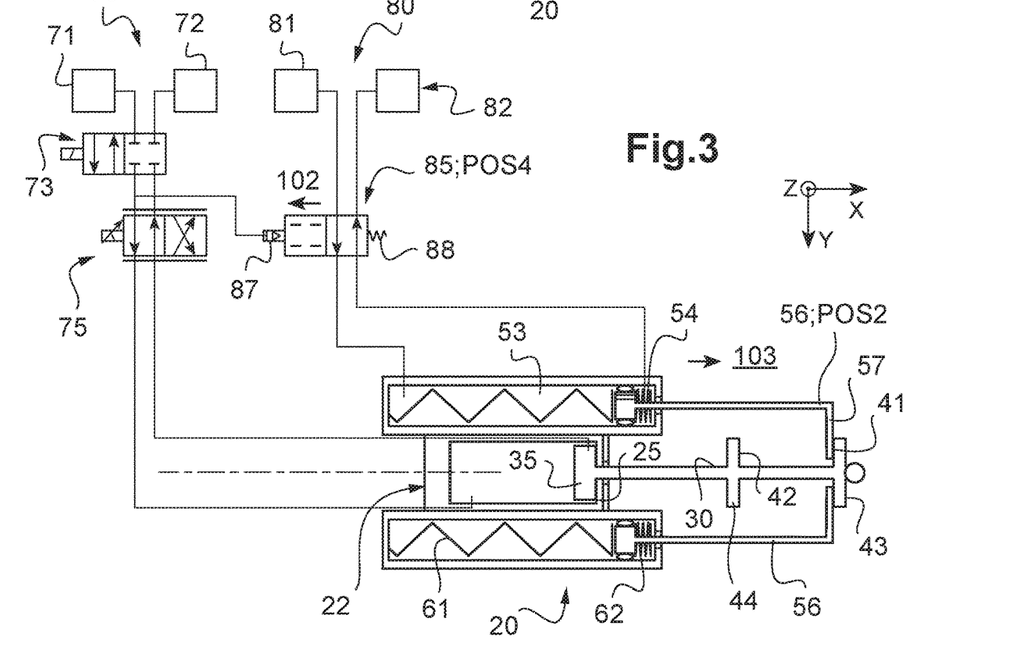

Referring to FIG. 3 and in the presence of a hydraulic failure in the main hydraulic circuit, the pressure drops in the buffer tank 87. The elastic member 88 then displaces the slide valve into its passivation position POS4 according to the arrow 102. The passivation extension chamber 53 is then filled with fluid, which induces a displacement according to the arrow 103 of the passivation shaft 56 into an extended extreme position POS2.

During this movement, the end-stop 57 enters into contact with the end-stop member 40, and in particular its second end-stop face 42. Consequently, the end-stop 57 drives the extension of the cylinder 22, and maintains this cylinder 22 in this position.

Moreover, the servo-control is favorably a fixed-body, single-body servo-control, namely a servo-control comprising one cylinder provided with a single body. However, the servo-control can comprise at least one body, and have a fixed or mobile body (bodies).

FIGS. 4 to 7 non-exhaustively illustrate various embodiments.

Figure 4:
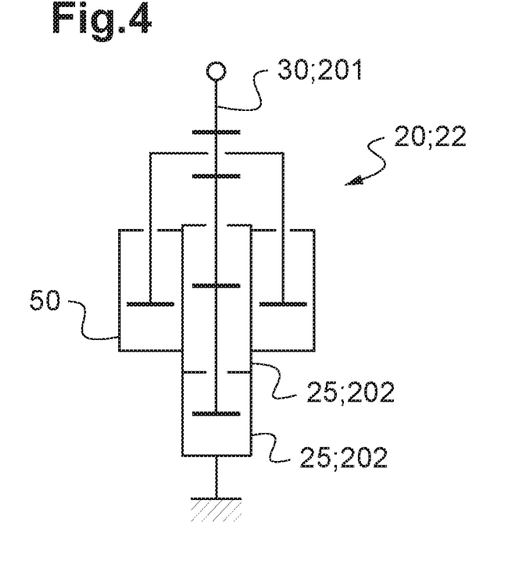

Thus, FIG. 4 represents a servo-control comprising a cylinder provided with two fixed bodies. Furthermore, the enclosure of the passivation actuator 50 is secured to a body and cooperates with an end-stop member fixed to the power shaft 30.

Figure 5:
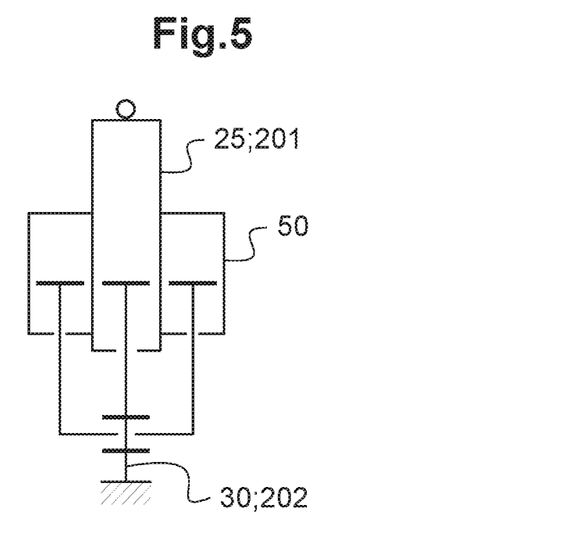

FIG. 5 presents a servo-control comprising a cylinder provided with a single mobile body. Furthermore, the enclosure of the passivation actuator 50 is secured to a body and cooperates with an end-stop member 40 fixed to the power shaft 30.

Figure 6:
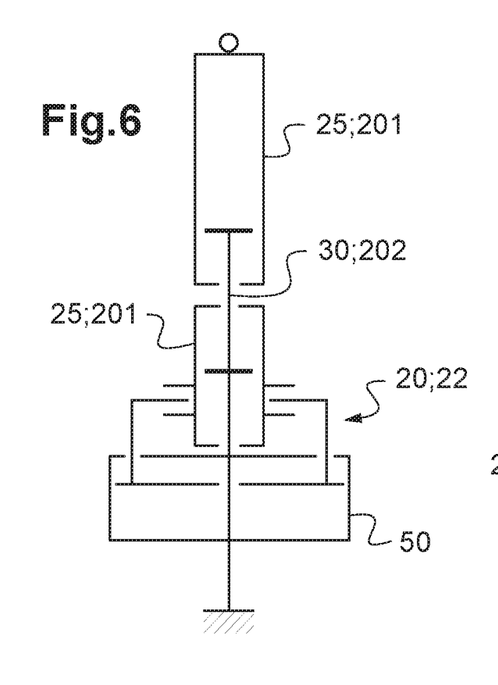

FIG. 6 presents a servo-control comprising a cylinder provided with two mobile bodies. Furthermore, the enclosure of the passivation actuator 50 is secured to the power shaft 30 and cooperates with an end-stop member 40 fixed to a body.

Figure 7:
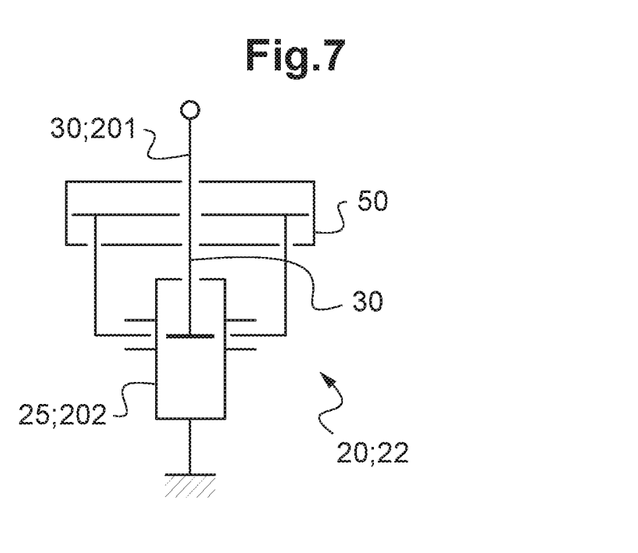

FIG. 7 presents a servo-control comprising a cylinder provided with a single mobile body. Furthermore, the enclosure of the passivation actuator 50 is secured to the power shaft 30 and cooperates with an end-stop member 40 fixed to a body.

Naturally, the present invention is subject to numerous variations as to its implementation. Although several embodiments have been described, it will be clearly understood that it is not possible to exhaustively identify all the possible embodiments. It is of course possible to envisage replacing a means described with an equivalent means without departing from the scope of the present invention.

What is claimed is:

1. A servo-control, the servo-control comprising at least one body as well as a power shaft and a control piston arranged in each body, the power shaft of a servo-control being secured to each control piston of the servo-control, the at least one body and the power shaft respectively forming two power members, the two power members respectively comprising an immobile member which is immobile in a reference frame of the servo-control and a mobile member which is mobile in longitudinal translation in relation to the immobile member, one of the power members bearing at least one end-stop member and the power member without the end-stop member bears a passivation actuator which is provided with an enclosure, the passivation actuator comprising a passivation shaft which bears an end-stop and a passivation piston, the passivation piston being arranged to be mobile in longitudinal translation in the enclosure, an elastic system being arranged between the passivation piston and the enclosure to tend to maintain the passivation shaft in a neutral position, the end-stop being arranged outside of the enclosure and longitudinally facing each end-stop member to be able to enter into contact with each end-stop member in case of failure,
wherein the passivation actuator comprises a damper which damps the longitudinal translation of the passivation shaft, the passivation piston separating a passivation retraction chamber and a passivation extension chamber formed in the enclosure and filled with fluid, the damper comprising at least one wire-drawing orifice linking the passivation extension chamber to the passivation retraction chamber.

2. The servo-control as claimed in claim 1,
wherein the at least one body and the power shaft respectively form the immobile member and the mobile member, or the at least one body and the power shaft respectively form the mobile member and the immobile member.

3. The servo-control as claimed in claim 1,
wherein the end-stop member comprises a first end-stop face and a second end-stop face arranged longitudinally on either side of the end-stop and facing one another.

4. The servo-control as claimed in claim 3,
wherein the power member provided with the end-stop member comprises a first shoulder provided with the first end-stop face and a second shoulder provided with the second end-stop face, the first shoulder and the second shoulder being separated longitudinally by a space in which the end-stop is arranged.

5. The servo-control as claimed in claim 3,
wherein the first shoulder and the second shoulder are borne by the power shaft.

6. The servo-control as claimed in claim 3,
wherein the first end-stop face is separated longitudinally from the second end-stop face by a length greater than a predetermined range of displacement of the mobile member in a non-failure case.

7. The servo-control as claimed in claim 1,
wherein the elastic system comprises two elastic members arranged longitudinally on either side of the passivation piston.

8. The servo-control as claimed in claim 1,
wherein the end-stop is separated from the power member provided with each end-stop member by a transverse gap, so as not to hamper the displacement of the mobile member in a non-failure case.

9. The servo-control as claimed in claim 1,
wherein the passivation piston as well as the passivation shaft and the end-stop are each of annular form and extend radially about an axis coinciding with a longitudinal axis along which the mobile member is displaced and the power shaft extends.

10. The servo-control as claimed in claim 1,
wherein no sealing means is arranged between the control piston and the corresponding body and between the power shaft and each body.

11. The servo-control as claimed in claim 1,
wherein the enclosure is sealed, at least one sealing means being arranged between the enclosure and the passivation piston.

12. The servo-control as claimed in claim 1,
wherein the enclosure is fixed to at least one body.

13. The servo-control as claimed in claim 1,
wherein, each control piston separating a control retraction chamber and a control extension chamber formed in a body, said servo-control comprising a main hydraulic distributor configured fluidically connected with a main hydraulic circuit as well as with the control retraction chamber and the control extension chamber, the servo-control comprises a secondary hydraulic distributor to be fluidically connected with a secondary hydraulic circuit as well as with the passivation retraction chamber and the passivation extension chamber, the secondary hydraulic distributor having a slide valve configured to be controlled by the main hydraulic circuit, the slide valve being in a rest position when the main hydraulic circuit is supplied with fluid and in a passivation position when the main hydraulic circuit is not supplied with fluid, the slide valve not fluidically connecting the secondary hydraulic circuit and the passivation actuator in the rest position, the slide valve being configured to fluidically connect a secondary hydraulic fluid supply link of the secondary hydraulic circuit and the passivation extension chamber and to fluidically connect a secondary hydraulic fluid return link of the secondary hydraulic circuit and the passivation reaction chamber in order to displace the passivation shaft and the power shaft into an extreme position.

14. The servo-control as claimed in claim 1,
wherein at least one servo-control comprises a single body.

15. A rotor provided with a plurality of blades,
wherein the rotor comprises at least one servo-control as claimed in claim 1, the servo-control being mechanically linked to each blade.

16. The rotor as claimed in claim 15,
wherein, the rotor comprising a set of swashplates linked to each blade by a pitch rod, the servo-control is articulated on the set of swashplates.

17. An aircraft,
wherein the aircraft comprises at least one servo-control as claimed in claim 1.

18. A servo-control, the servo-control comprising a body, a power shaft and a control piston arranged in the body, the power shaft secured to the control piston, the body and the power shaft respectively forming two power members, the two power members respectively comprising an immobile member which is immobile in a reference frame of the servo-control and a mobile member which is mobile in longitudinal translation in relation to the immobile member, one of the power members bearing an end-stop member and the power member without the end-stop member bearing a passivation actuator having an enclosure, the passivation actuator comprising a passivation shaft bearing an end-stop and a passivation piston, the passivation piston being mobile in longitudinal translation in the enclosure, an elastic system arranged between the passivation piston and the enclosure to tend to maintain the passivation shaft in a neutral position, the end-stop arranged outside of the enclosure and longitudinally facing the end-stop member to be able to enter into contact with each end-stop member in case of failure,
wherein the passivation actuator comprises a damper which damps the longitudinal translation of the passivation shaft, the passivation piston separating a passivation retraction chamber and a passivation extension chamber in the enclosure and filled with fluid, the damper comprising a wire-drawing orifice linking the passivation extension chamber to the passivation retraction chamber.

19. The servo control as claimed in claim 18,
wherein the body and the power shaft respectively form the immobile member and the mobile member, or the body and the power shaft respectively form the mobile member and the immobile member.

20. The servo-control as claimed in claim 19,
wherein the end stop member comprises a first end stop face and a second end stop face arranged longitudinally on either side of the end stop and facing one another.

* * * * *